(12) United States Patent
Forrest et al.

(10) Patent No.: US 8,221,100 B2
(45) Date of Patent: Jul. 17, 2012

(54) HIGH PRESSURE WATER PUMP VALVE AND SEAL STRUCTURE

(75) Inventors: Jamie A. Forrest, Commerce Township, MI (US); Matthew O. Herhold, Fenton, MI (US)

(73) Assignee: NLB Corp., Wixom, MI (US)

( * ) Notice: Subject to any disclaimer, the term of this patent is extended or adjusted under 35 U.S.C. 154(b) by 808 days.

(21) Appl. No.: 12/327,846

(22) Filed: Dec. 4, 2008

(65) Prior Publication Data

US 2010/0140526 A1    Jun. 10, 2010

(51) Int. Cl.
*F04B 39/10* (2006.01)
*F04B 53/10* (2006.01)

(52) U.S. Cl. ........ 417/567; 417/553; 417/571; 417/559; 137/540; 137/543.21; 251/359; 251/363

(58) Field of Classification Search .................. 251/359, 251/63.5, 362, 363; 417/545, 553, 571, 567, 417/559; 137/540, 543.19, 543.21
See application file for complete search history.

(56) References Cited

U.S. PATENT DOCUMENTS

| | | | |
|---|---|---|---|
| 3,106,169 A * | 10/1963 | Prosser et al. | 417/567 |
| 3,260,217 A * | 7/1966 | Thresher | 417/567 |
| 3,309,013 A * | 3/1967 | Bauer | 417/567 |
| 3,702,624 A * | 11/1972 | Fries | 137/512 |
| 3,811,801 A * | 5/1974 | Buse et al. | 417/454 |
| 4,026,322 A * | 5/1977 | Thomas | 137/512 |
| 4,412,792 A * | 11/1983 | LaBorde et al. | 417/454 |
| 4,551,077 A * | 11/1985 | Pacht | 417/454 |
| 4,878,815 A * | 11/1989 | Stachowiak | 417/63 |
| 5,037,277 A * | 8/1991 | Tan | 417/567 |
| 5,230,363 A * | 7/1993 | Winn et al. | 137/512.3 |
| 5,605,449 A * | 2/1997 | Reed | 417/454 |
| 5,924,853 A * | 7/1999 | Pacht | 417/567 |
| 6,886,832 B2 | 5/2005 | Forrest | |
| 7,121,812 B2 | 10/2006 | Forrest | |
| 7,182,016 B2 | 2/2007 | Forrest | |
| 7,367,789 B2 * | 5/2008 | Raghavan et al. | 417/571 |
| 2004/0178285 A1 * | 9/2004 | Forrest | 239/381 |

FOREIGN PATENT DOCUMENTS

JP    2001355545 A   *   12/2001

* cited by examiner

*Primary Examiner* — Anne Hines
*Assistant Examiner* — Jose M Diaz
(74) *Attorney, Agent, or Firm* — Carlson Gaskey & Olds P.C.

(57) ABSTRACT

A valve seat for use in a high pressure pump comprises an inner portion force fit within an outer portion. The outer portion has a fluid plenum at an outer peripheral surface. Fluid passages extend radially inwardly to communicate with a valve recess in the inner portion. A seal housing for a high pressure pump comprises an outer portion and an inner portion. The inner portion is force fit within the outer portion. The inner portion has an inner bore having a first location to receive seal packings, and a second location to receive valve spring structure. The inner portion has a curved surface that bottoms out against a curved surface within the outer portion.

22 Claims, 3 Drawing Sheets

HIGH PRESSURE WATER PUMP VALVE AND SEAL STRUCTURE

BACKGROUND OF THE INVENTION

This application relates to a unique valve seat structure and a unique seal housing structure for use in a high pressure water pump.

High pressure water pumps are known, and may operate at pressures up to 55,000 psi. Sealing the water at such high pressures becomes important. Thus, all locations exposed to the pump fluid must be carefully designed and controlled.

Potential areas for leakage include the area between the pump piston and its cylinder, which typically includes seal packings. In addition, the valves, and especially the inlet valve, are often locations where leakage occurs.

SUMMARY OF THE INVENTION

In disclosed embodiments of this invention, a seal housing is formed of two portions. An inner portion carries the seal packings, and is mounted within an outer portion. The two are force fit together, and an end of the inner portion remote from the pump chamber is formed with a curved shoulder to bottom out within the outer portion.

A valve seat for use in a high pressure pump comprises an inner portion force fit within an outer portion. The outer portion has a fluid plenum at an outer peripheral surface. Fluid passages extend radially inwardly to communicate with a valve recess in the inner portion.

In another feature, an inlet valve is mounted within the inner portion. The inlet valve is received in a recess surface at the end of the valve seat. The fluid to be moved into the pump chamber is directed into the plenum formed at a radially outer location in the outer portion of the valve seat. Water flows from this plenum through radially directed passages and against the inlet valve.

These and other features of the present invention can be best understood from the following specification and drawings, the following of which is a brief description.

DETAILED DESCRIPTION OF THE PREFERRED EMBODIMENT

Figure 1:
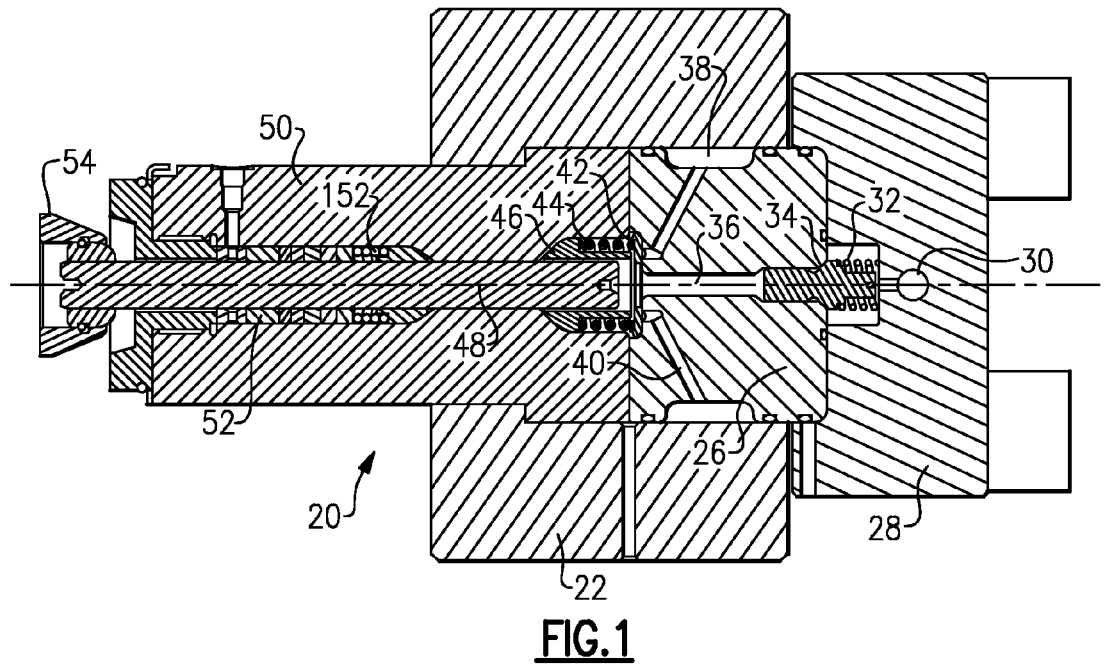
FIG. 1 is a cross-sectional view through an inventive pump.

A pump 20 is illustrated in FIG. 1 having an outer block housing 22. A discharge manifold 28 is mounted against a valve seat housing 26. Valve seat housing 26 is shown as one piece in this view, however, as can be appreciated from FIG. 5, it is actually formed of two portions. Water is directed into a plenum 38 which is formed at an outer peripheral surface on the valve seat housing 26. From the plenum 38, the water flows through several circumferentially spaced passages 40 and against a valve 42. The valve 42 is mounted within a recess in the valve seat 26, as shown in FIG. 3. A spring 44 biases the valve against the valve seat to close the passages 40. A spring mount 46 mounts the spring 44. A pump piston 48 moves rearwardly and forwardly within a pump chamber, and delivers pump fluid through a pump chamber 36 leading to a discharge valve 34. Discharge valve 34 is spring biased at 32 to a closed position. The water from the discharge chamber moves to a discharge passage 30, as will be better understood with regard to FIG. 2. A drive mount 54 drives the piston 48 with a motor, which may be as known. As one example, a diesel engine drive may be used.

A seal housing 50 mounts seal packings 52. Seal housing 50 is shown as one piece, but in practice is actually formed of two portions, and will be better understood with reference to FIG. 4.

Figure 2:
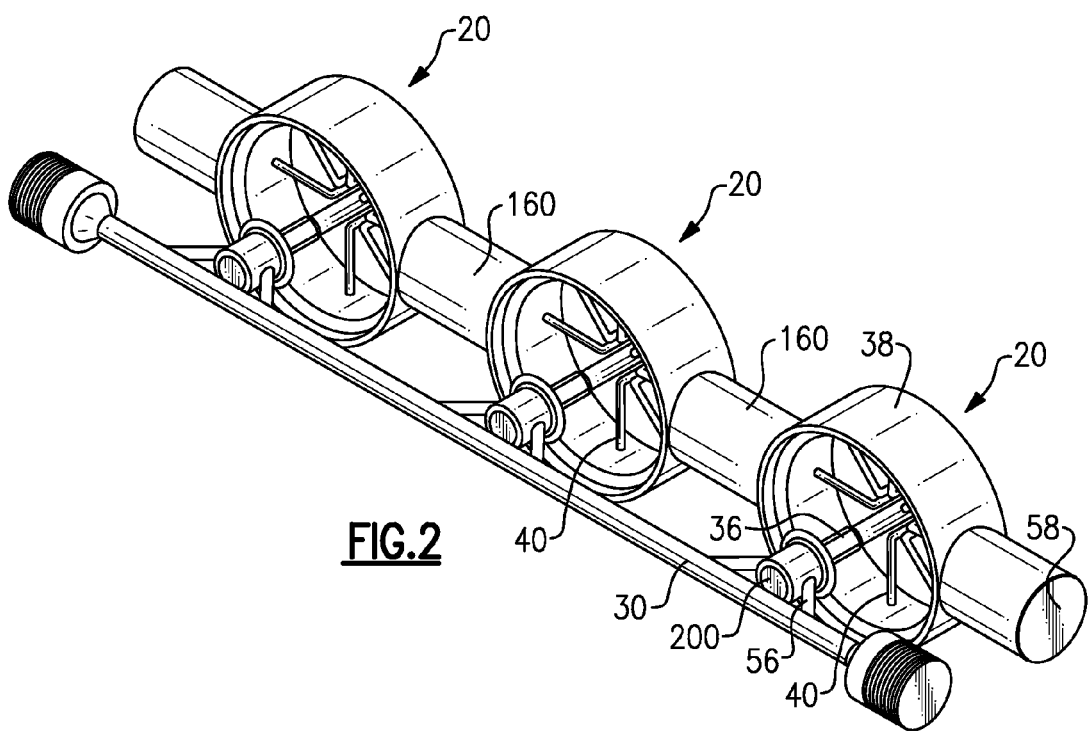
FIG. 2 shows the water flow passages within the inventive pump.
Figure 3:
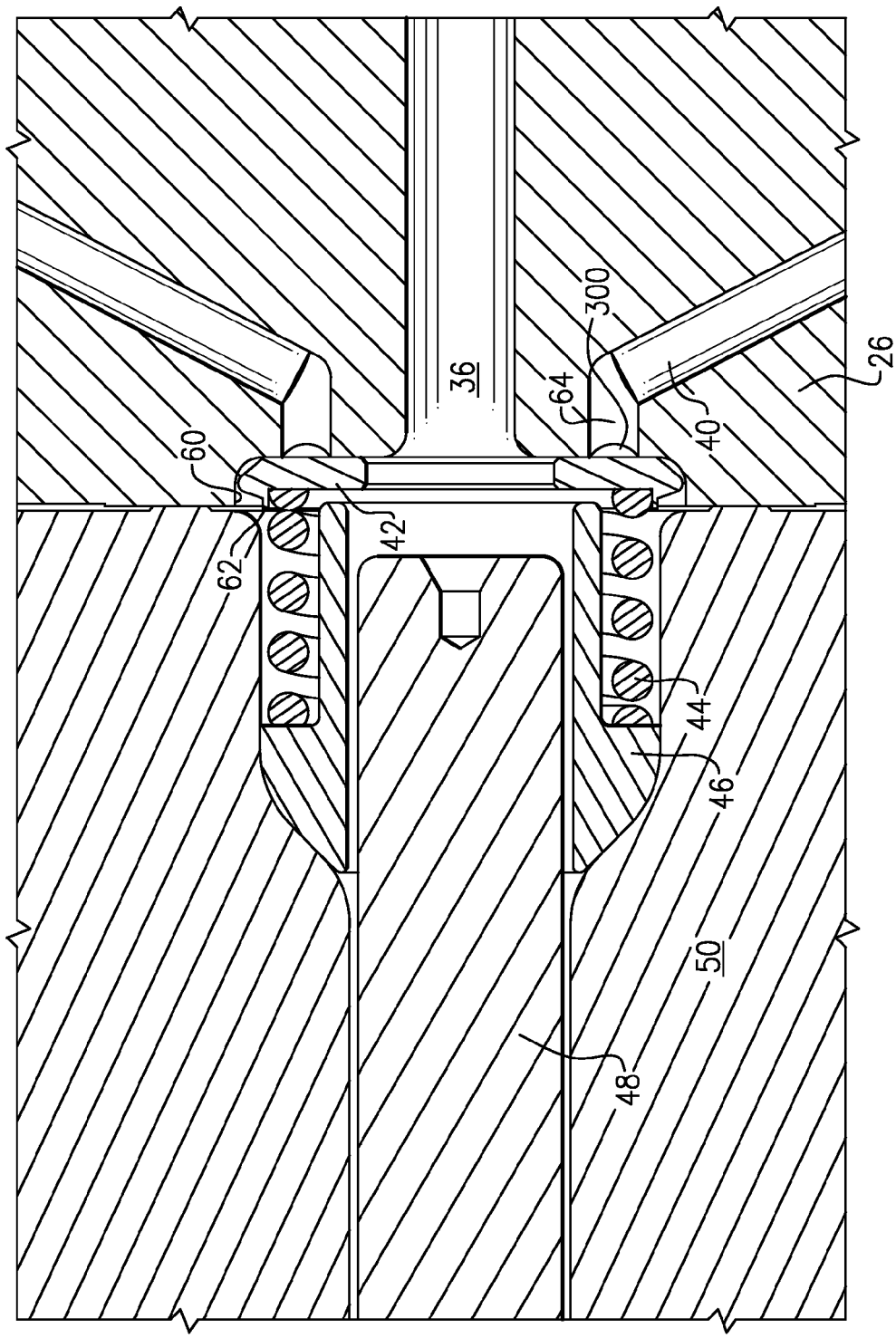
FIG. 3 is a detailed view of the inlet valve.

FIG. 2 does not show structure of the pump 20, but actually shows the water flow passages. As can be appreciated, water comes into an inlet 58, into the circumferential plenum chambers 38 surrounding each of the several pump chambers, through passages 40, and into the pump chamber. As can be appreciated, the discharge passages 36 communicate with a chamber 200, and to branch passages 56 through a discharge manifold 30. Connecting passages 160 pass the water from one plenum 38 downstream to the next.

As can be appreciated, while a single pump chamber is illustrated in FIG. 1, in practice, the pumps are often mounted in parallel as shown in FIG. 2.

FIG. 3 is a detail of the valve 42. As shown, valve 42 sits within a recess 60 formed in an outer face of the valve seat housing 26. Water from the passages 40 extends to a turn 64 leading into an annulus 300 extending against the face of the valve 42. As can be seen, annulus 300 is cut as a curved surface into the valve seat. A recess 60 guides valve 42 and communicates to pump chamber 36. Passage 40 extends at an angle that includes both an axial and a radial component. When the pump piston 48 is retracted, or moved to the left as shown in FIG. 3, the force of water in the passages 64 will move the valve 42 away from its seat, and allow the water to flow into the pump chamber 36. As shown, the valve spring 44 is mounted on the spring mount 46, and received within the seal housing 50.

Figure 4:
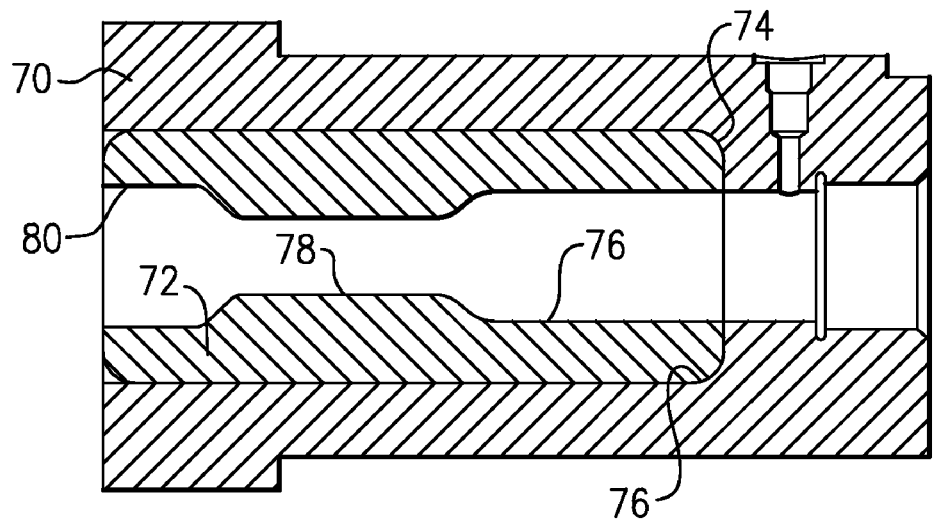
FIG. 4 is a cross-sectional view through a seal housing.

FIG. 4 shows a detail of the seal housing 50. As shown, an outer seal housing portion 70 receives an inner seal housing portion 72. Inner seal housing portion includes a bore with three distinct chambers. Chamber 80 receives the valve spring mount 46. Inner chamber 78 provides shoulders for spring mount 46 and packing spring 152. Chamber 76 receives the packings 52. As shown, an end 74 of the inner housing 70 bottoms out against a curved surface 76 in the outer housing 70. The inner portion 72 is force fit into the outer housing, and bottoms out to provide desired operation of the seal housing. As can be seen, outer portion 70 extends axially beyond the end of inner portion 72.

Figure 5:
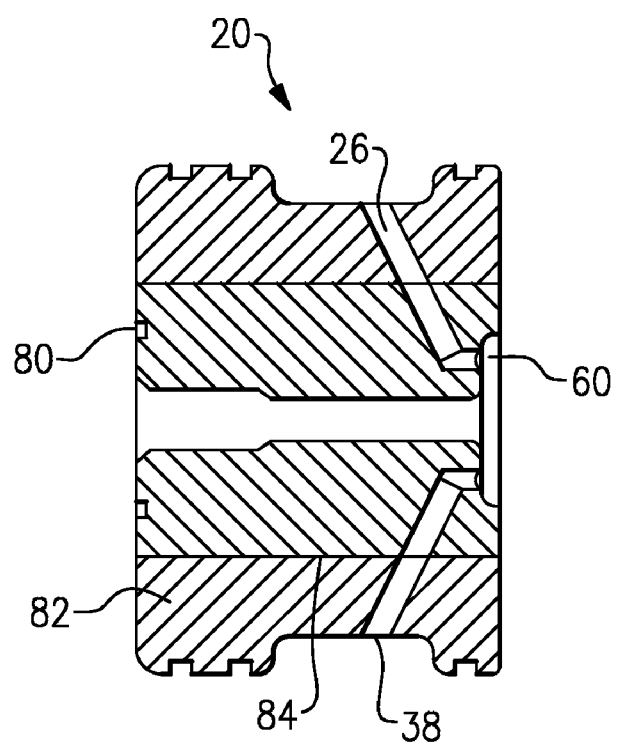
FIG. 5 is a cross-sectional view through the inlet valve seat housing.

FIG. 5 shows detail of the valve seat housing 26. As shown, an inner portion 80 is force fit within an outer portion 82. In the past, the force fit has sometimes been at a draft angle, however, in the present valve seat housing 26, the force fit surfaces are cylindrical and straight. As shown, the recess 60 is formed in the inner valve housing 80.

This invention has application in high pressure water jet pumps. As an example, such pumps may operate on a range of 10,000-55,000 psi.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A valve seat for use in a high pressure pump comprising:
   an inner portion force fit within an outer portion; and said outer portion having a fluid plenum at a radially outer peripheral surface, and fluid passages extending radially inwardly to communicate with a valve recess in said inner portion, wherein said fluid plenum is at an outermost peripheral surface of said outer portion.

2. The valve seat as set forth in claim 1, wherein said inner portion and said outer portion are force fit along relatively cylindrical straight surfaces.

3. The valve seat as set forth in claim 1, wherein said radially extending passages extend on an angle having a component both radially inward, and axially toward said recess, and said passages then turning to a second portion that extends generally parallel to an axial direction toward the valve seat recess.

4. The valve seat as set forth in claim 1, wherein a cylindrical valve is received within said recess, and has a central passage to allow water to pass toward a discharge.

5. The valve seat as set forth in claim 1, wherein an annulus is upstream of said valve recess within said inner portion, and no portion of said annulus extends axially past said inner portion.

6. A seal housing for a high pressure pump comprising:
an outer portion and an inner portion, said inner portion being force fit within said outer portion, said inner portion having an inner bore having a first location to receive seal packings, and a second location to receive valve spring structure, and said inner portion having a curved surface that bottoms out against a curved surface within said outer portion.

7. The seal housing as set forth in claim 6, wherein said outer portion extends axially beyond an axial end of said, inner portion at the curved surface.

8. A pump comprising:
a valve seat housing comprising an inner portion force fit within an outer portion, said outer portion having a fluid plenum at an outer peripheral surface, and fluid passages extending radially inwardly to communicate with a valve recess in said inner portion;
a valve seal housing including an outer portion and an inner portion, said inner portion being force fit within said outer portion, said inner portion having an inner bore having a first location to receive seal packings, and a second location to receive valve spring structure, and said inner housing having a curved surface that bottoms out against a curved surface within said outer housing; and
a pump piston movable within said inner bore of said valve seal housing, and toward and away from said valve seat housing to move fluid having passed through said inlet valve into a pump chamber and toward a discharge valve.

9. The pump as set forth in claim 8, wherein said inner portion and said outer portion of said valve seat housing are force fit along relatively cylindrical straight surfaces.

10. The pump as set forth in claim 8, wherein said radially extending passages extend on an angle having a component both radially inward, and axially toward said recess, and said passages then turning to a second portion that extends generally parallel to an axial direction toward the valve seat recess.

11. The pump as set forth in claim 8, wherein a cylindrical valve is received within said recess, and has a central passage to allow water to pass toward a discharge.

12. The pump as set forth in claim 8, wherein said outer portion extends axially beyond an axial end of said inner portion at the curved surface.

13. The valve seat as set forth in claim 8, wherein an annulus is upstream of said valve recess within said inner portion, and no portion of said annulus extends axially beyond said inner portion.

14. The seal housing as set forth in claim 6, wherein said inner bore extends along an axis and said curved surface of said inner portion is curved in at least two dimensions relative to said axis.

15. The seal housing as set forth in claim 6, wherein said inner portion is a monolithic structure.

16. The seal housing as set forth in claim 6, wherein said inner portion has a consistent outer diameter.

17. The seal housing as set forth in claim 6, wherein said curved surface is formed within a single piece of material within said outer portion.

18. The seal housing as set forth in claim 8, wherein said inner portion is a monolithic structure.

19. The seal housing as set forth in claim 8, wherein said inner portion has a consistent outer diameter.

20. The seal housing as set forth in claim 8, wherein said curved surface is formed within a single piece of material within said outer portion.

21. The pump as set forth in claim 8, wherein said inner bore extends along an axis and said curved surface is curved in at least two dimensions relative to said axis.

22. The pump as set forth in claim 8, wherein said fluid plenum is at an outermost peripheral surface of said outer portion.

* * * * *